United States Patent [19]

Stockill

[11] Patent Number: 5,359,367
[45] Date of Patent: Oct. 25, 1994

[54] PERSONAL COMPUTER WITH BROADCAST RECEIVER ON EXPANSION BOARD CONTROLLED BY COMPUTER MICROPROCESSOR

[75] Inventor: Trevor R. Stockill, Romford, United Kingdom

[73] Assignee: Videologic Limited, Hertfordshire, United Kingdom

[21] Appl. No.: 859,690

[22] Filed: Jun. 8, 1992

[30] Foreign Application Priority Data

Oct. 9, 1989 [GB] United Kingdom ............. 8922702.9

[51] Int. Cl.⁵ .................... H04N 5/46; H04N 5/445
[52] U.S. Cl. ................... 348/552; 348/465; 348/731
[58] Field of Search ............. 358/147, 142, 903, 141.1, 358/188, 86, 160, 183; 340/721; 455/142, 133, 188.2, 180.2; H04N 7/087, 5/445, 5/46

[56] References Cited

U.S. PATENT DOCUMENTS

| | | | |
|---|---|---|---|
| 3,745,241 | 7/1973 | Hirashima | 358/188 |
| 4,337,480 | 6/1982 | Bourassin et al. | 358/188 |
| 4,562,535 | 12/1985 | Vincent et al. | 364/200 |
| 4,729,028 | 3/1988 | Micic et al. | 358/183 |
| 4,894,714 | 1/1990 | Christis | 358/191.1 |
| 5,170,252 | 12/1992 | Gear et al. | 358/181 |
| 5,181,113 | 1/1993 | Chang | 358/142 |
| 5,192,999 | 3/1993 | Graczyk et al. | 358/903 |
| 5,245,429 | 9/1993 | Virginio et al. | 358/142 |
| 5,249,164 | 9/1993 | Koz | 358/903 |
| 5,251,301 | 10/1993 | Cook | 358/142 |

FOREIGN PATENT DOCUMENTS

| | | | |
|---|---|---|---|
| 300193 | 1/1989 | European Pat. Off. | H04N 5/445 |
| 320641 | 6/1989 | European Pat. Off. | H04N 5/46 |
| 0171877 | 9/1985 | Japan | 358/11 |
| 0217077 | 8/1990 | Japan | H04N 5/46 |
| 2149277 | 6/1985 | United Kingdom . | |

OTHER PUBLICATIONS

Gerhard Eitz and Karl-Ulrich Oberlies, "Videotext Programmiert Videoheimgeraete (VPV)", Rundfunktechnische Mitteilungen, Sep./Oct., 1986, vol. 30, Issue 5, pp. 223-229; and partial English translation.

Primary Examiner—Mark R. Powell
Assistant Examiner—Jeffery S. Murrell
Attorney, Agent, or Firm—Flynn, Thiel, Boutell & Tanis

[57] ABSTRACT

A broadcast receiver (22) for receiving television broadcast signals carrying encoded data e.g. teletext information, includes a tuner (30), a demodulator (32) and a data extractor (36) for decoding the data. The receiver is coupled to a computer through a bus (38) and an interface controller (40). The tuner (30), the demodulator (32) and the data extractor (36) are each individually controllable by the interface controller (40) in response to instructions from the computer to vary any of the tuning, the demodulation parameters, or the data extraction parameters. A data processor (54) processes the extracted data, and can also control the tuner (30), the demodulator (32) and the data extractor (36).

24 Claims, 5 Drawing Sheets

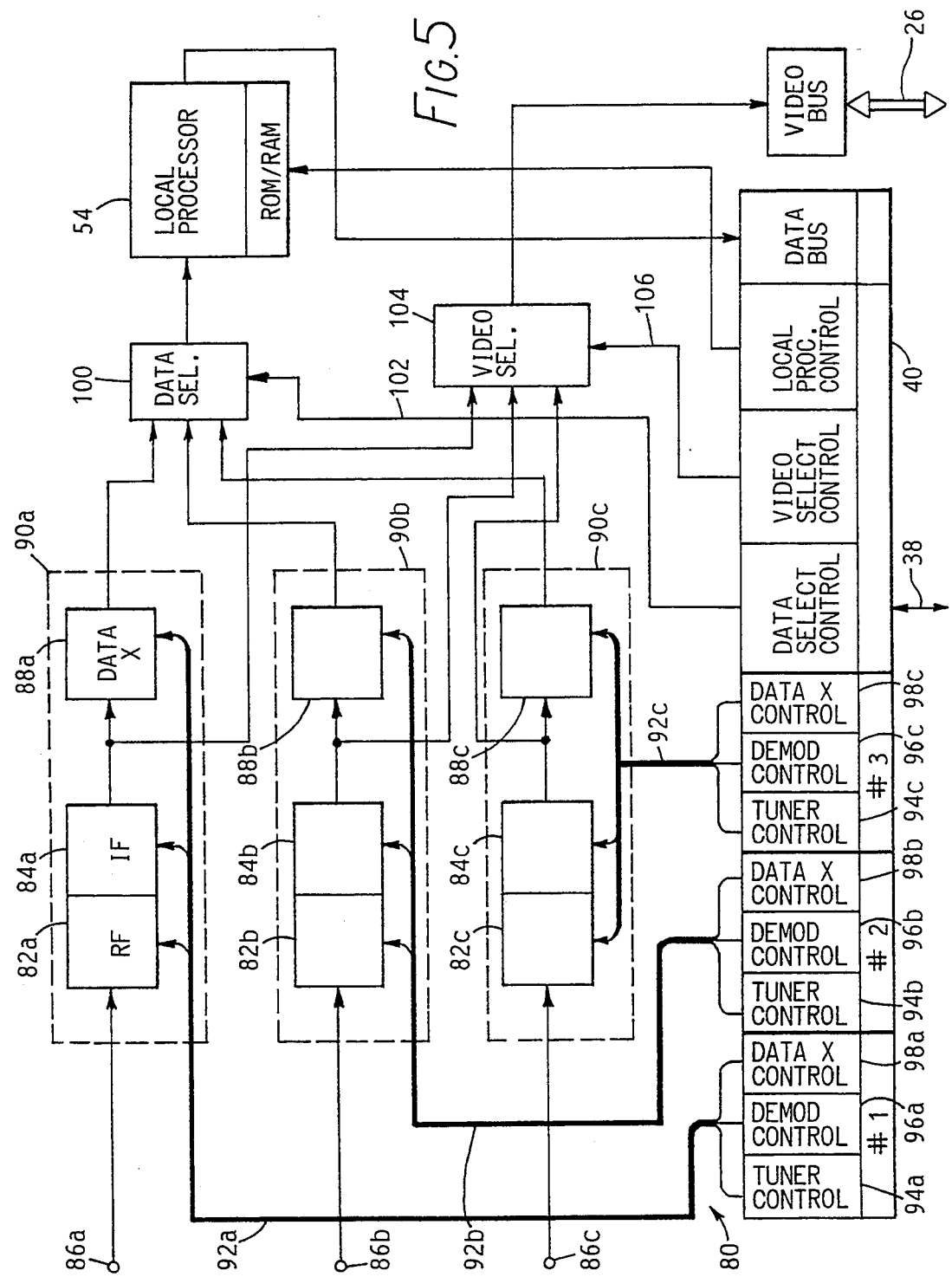

PERSONAL COMPUTER WITH BROADCAST RECEIVER ON EXPANSION BOARD CONTROLLED BY COMPUTER MICROPROCESSOR

FIELD OF THE INVENTION

The present invention relates to the field of information technology, and in particular to a broadcast receiver for the reception of data encoded in or carried by, for example, radio or television signals.

SUMMARY OF THE INVENTION

The present invention is defined in the appended claims.

In an apparatus according to the invention, a programmable computer contains a receiver for receiving broadcast signals under the control of the computer. The receiver includes a circuit for extracting data from the received signals and, once extracted, the data may be processed by the computer. The receiver includes a tuner and a data extractor. The tuning and the data extraction parameters are controlled by the computer.

The broadcast signals can, for example, be radio frequency signals, and the receiver can be of the type for receiving the signals from an antenna, satellite dish, cable or optical fibre input. The radio frequency signals are demodulated in the receiver from their respective carriers. The method of demodulation and the associated demodulation parameters can be controlled by the computer.

The invention allows a computer to intelligently receive and use data coded in the many broadcast information services that are generally available. It has hitherto been very difficult to separate and use interactively such data owing to the vast amount of, and variety of encoding formats for, the data. With the invention, a computer can scan, receive and act upon data for which it is programmed to search. The computer can also be programmed to process the received data, for example, to sort and index it for later retrieval.

One or more sub-receivers may be provided in the receiver, each sub-receiver being individually controllable by the computer.

The receiver may be of a universal type for which all of the parameters are controllable. Alternatively, one or more of the receivers or sub-receivers may be dedicated, for example, for receiving satellite broadcasts, or for receiving UK television signals.

The receiver is especially suitable for incorporating into a personal computer. Demodulation and subsequent data extraction may be done in such a way that one or several channels of information may be simultaneously accessed at any one time. The data separated or extracted from the broadcast signals may then be further acted on by computer software within the personal computer so that logical decisions and actions may be taken by the computer based on the contents of the recovered data. The data may then be archived within the personal computer for later recovery, or it may be passed to a suitable external device for immediate display or storage.

In one embodiment, television signals demodulated with the data may be further processed within the personal computer before being displayed or stored by the computer or other external device. The computer may be used to maintain an index of data saved internally, and of the signals recorded externally, to enable recorded signals to be retrieved quickly and easily.

The receiver may be conveniently be assembled on a circuit board that can be plugged into an expansion interface of the computer.

DESCRIPTION OF PREFERRED EMBODIMENTS

Embodiments of the invention will now be described by way of example, with reference to the accompanying drawings, in which:

FIG. 5 is a block diagram showing a modified design of the receiver including multiple-tuners.

Figure 1:
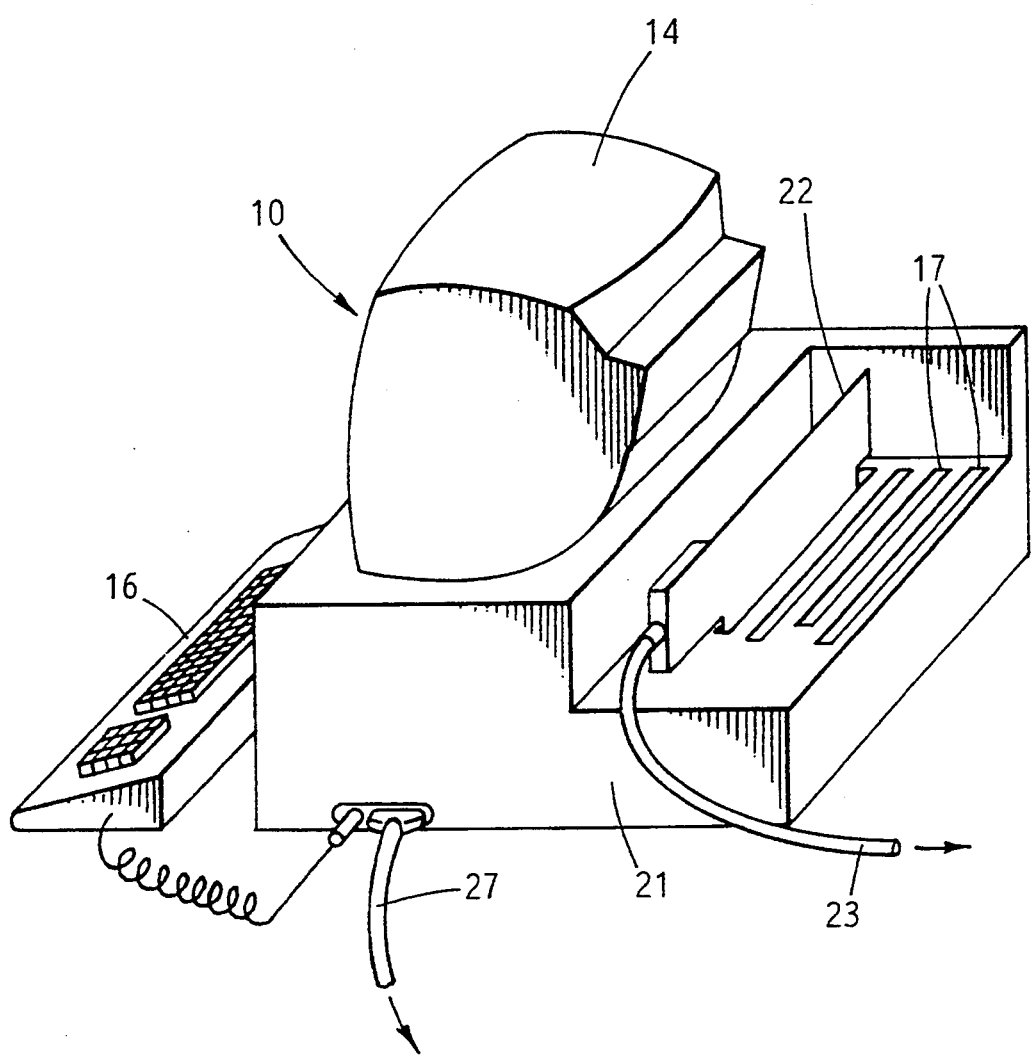
FIG. 1 is a perspective view of computer including a receiver in accordance with the invention.
Figure 2:
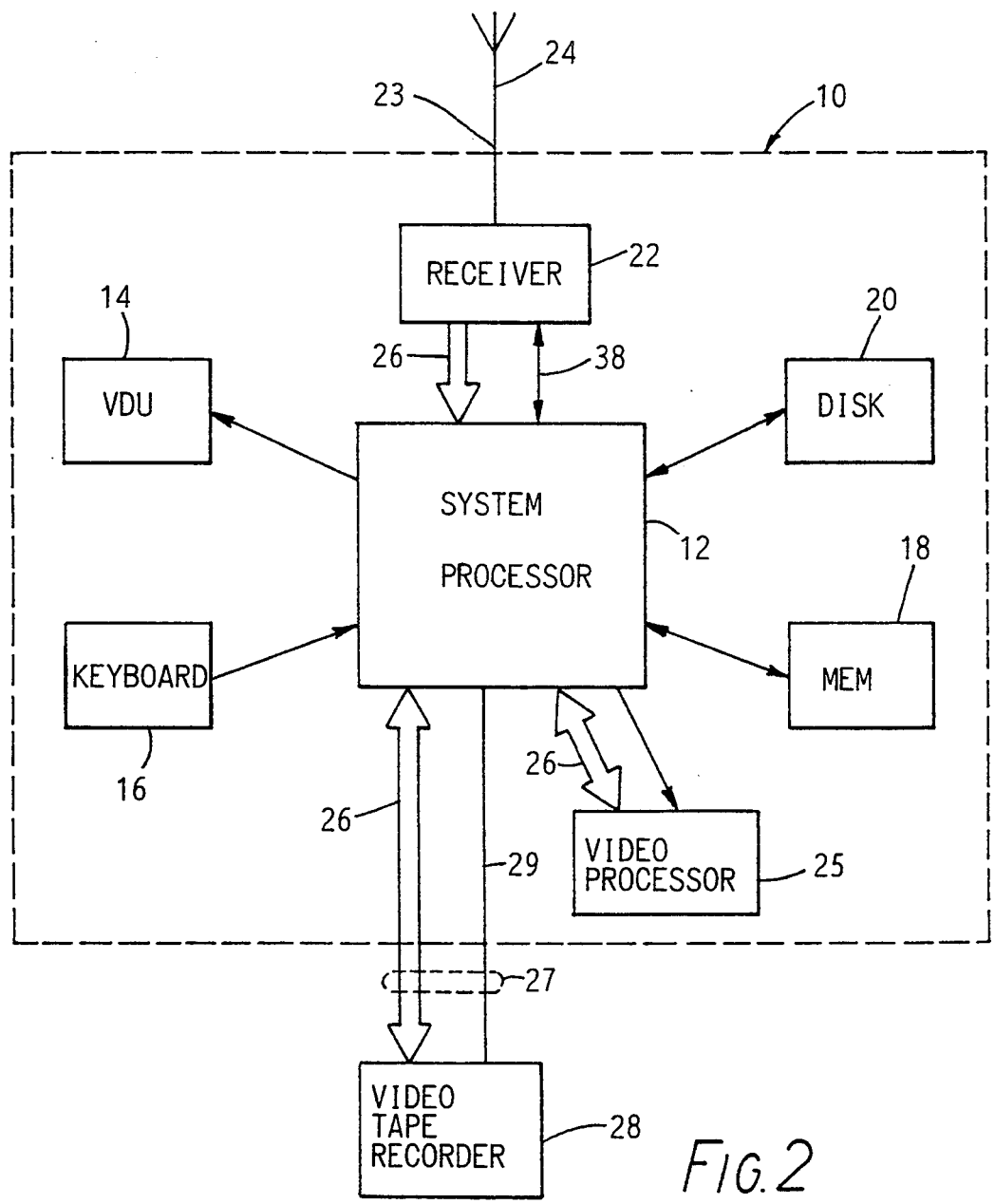
FIG. 2 is a block diagram of the system of FIG. 1.

Referring to FIGS. 1 and 2, a conventional personal computer system 10 includes a system processor unit 12, a VDU 14, a keyboard 16, memory 18 in the form of RAM and ROM, and a magnetic disk storage device 20. The memory 18 and the system processor 12 are carried on a motherboard contained in a case 21, and the other devices are connected by means of ports to the motherboard. A receiver board 22 is plugged into an expansion interface slot 17 of the motherboard. The receiver 22 has an input 23 connected to an external television antenna 24. A video processor board 25 is also plugged into a further interface port of the motherboard. The video processor 25 is connected to the system processor 12 and to the receiver 22 by means of a video bus 26. The video processor 25 can, for example, process the video signal by converting it to a suitable format for display, or process the video image before it is stored or displayed. The video bus is an analogue bus, along which analogue video signals are sent.

The system 10 has an output 27 connected to a video tape recorder 28. The output 27 includes a connection to the video bus 26, and a video control bus 29 by which the computer 10 can control the video tape recorder 28 to record television and video signals from the video bus 26.

Figure 3:
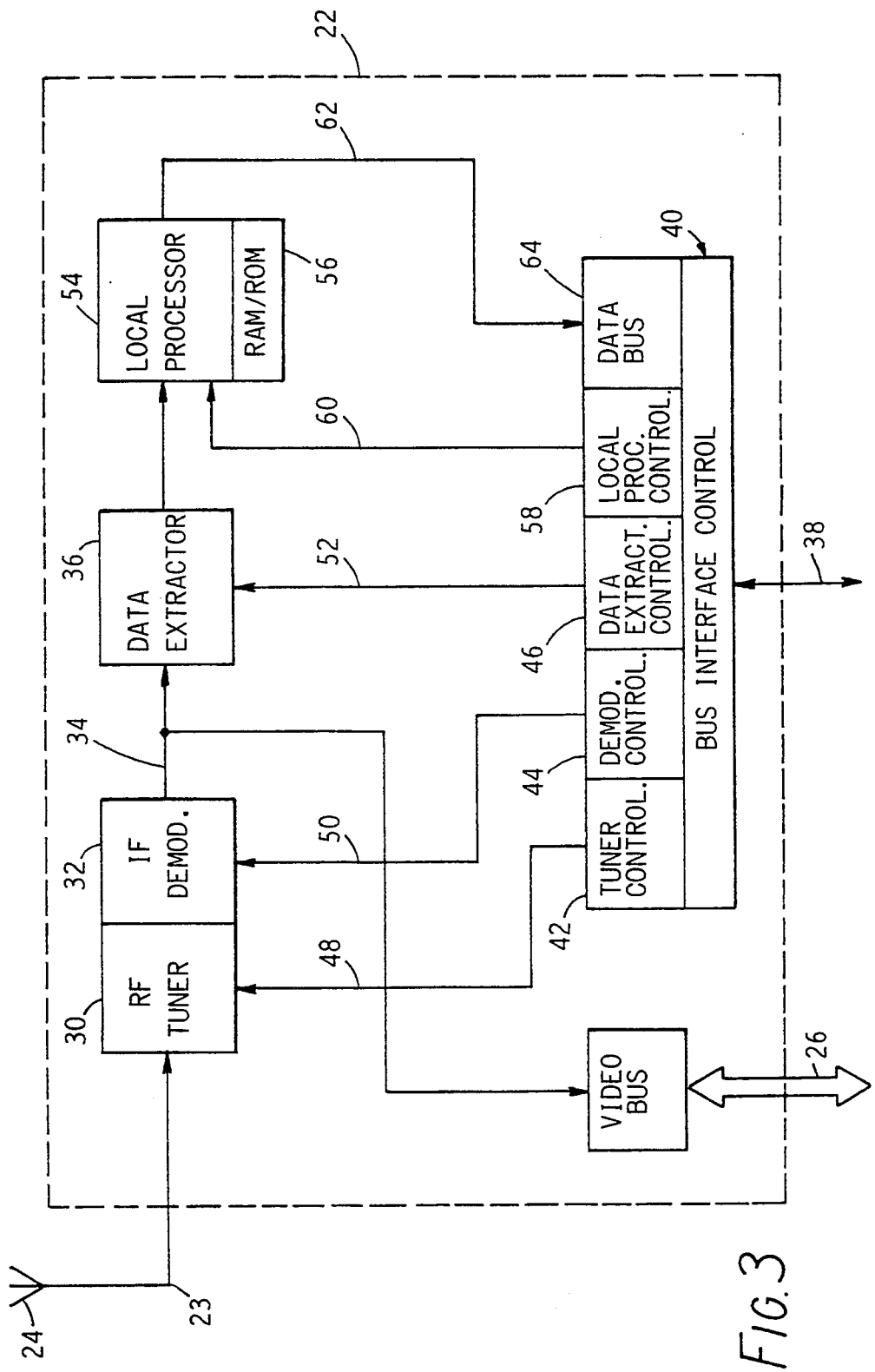
FIG. 3 is a block diagram of the receiver included in FIG. 2.

The receiver 22, shown in rare detail in FIG. 3, is a single channel television receiver, configured to receive domestic television broadcasts. The receiver includes a television RF "front end" tuner circuit 30. The tuner 30 can be built around a standard RF module. A suitable module is the FE617Q from Mullard.

The IF signal output from the tuner 30 is fed to an IF demodulator 32. The demodulator is described in more detail hereinafter. The demodulated output 34 is fed to a data extractor circuit 36 capable of decoding teletext information from received television signals. The data extractor 36 can be built around a standard universal decoding integrated circuit, and a suitable integrated circuit is the SAA5231 from Philips. In this embodiment for decoding teletext information, the data extractor 36 can also include a dedicated teletext control circuit, and a suitable integrated circuit is the SAA5243 from Philips.

The video output from the demodulator is also coupled to the video bus 26, connected to the system processor 12.

The tuner 30, the demodulator 32 and the data extractor 36 are each individually controllable by the system processor 12. The receiver 22 is connected to the system processor by an interface bus 38, and a bus interface control circuit 40 in the receiver 22 is coupled to the interface bus 38 to decode control signals received from the system processor. The control circuit 40 includes a tuner controller 42, a demodulator controller 44 and a data extraction controller 46, coupled respectively to the tuner 30, the demodulator 32 and the data extractor 36 by control lines or busses 48, 50, 52, respectively.

The tuner controller 42 controls the tuning frequency of the tuner 30. For the Mullard FE617Q tuner module described hereinbefore, the tuning is controlled by applying a variable voltage to the module through the control line 48. The value of the applied voltage is controlled by the tuner controller 42, in response to instructions from the system processor 12.

The demodulator controller 44 controls the demodulation parameters of the demodulator 32. These can include the type of demodulation, either AM or FM, and the particular modulation frequency bandwidth of the type of signal being received. As described in greater detail hereinafter, domestic television broadcasts employ FM modulation for sound, and therefore AM demodulation circuitry need not be included. However, the intercarrier frequency for the sound depends on the broadcasting standard of the signal. For example, the intercarrier frequency for UK television signals is 6 MHz. For other European television signals the intercarrier frequency is 5.5 MHz. For the USA, the intercarrier frequency is 4.5 MHz. The appropriate demodulation parameters are selected by the demodulator controller 44, in response to .instructions from the system processor 12.

The data extractor controller 46 controls the extraction parameters of the data extractor 36. For teletext, these parameters include the position of the teletext information in the television signal, and the number of the teletext page to be decoded. The data extractor controller can control the data extractor to decode information from any particular TV line, multiple lines, or full frame. In domestic television signals, the teletext information is encoded in the vertical blanking interval of the television signal. Therefore the data extractor is controlled to decode information only during the vertical blanking interval. In response to instructions from the system processor 12, the data extractor controller 46 also controls which teletext page is decoded.

The receiver 22 also includes a local processor 54 coupled to the output of the data extractor 36. The local processor has its own local memory in the form of RAM and ROM 56. A suitable local processor is the Intel 8186 16-bit microprocessor. The local processor is coupled by a further control bus 60 to a local processor controller 58 in the bus interface control circuit 40. The local processor 54 is programmed and controlled in response to data and instructions from the host processor 12. The data output 62 from the local processor is fed to a data output buffer 64 in the bus interface control circuit. The system processor 12 can read this output data over the interface bus 38.

The local processor 54 is used to process the data extracted by the data extractor 36, and is provided to relieve the system processor from having to process all of the extracted data. This allows the system processor to perform other tasks with minimum interruption. The local processor is also capable of controlling the tuner controller 42, the demodulator controller 44, and the data extraction controller 46, in response to the results of the processed extracted data.

Figure 4:
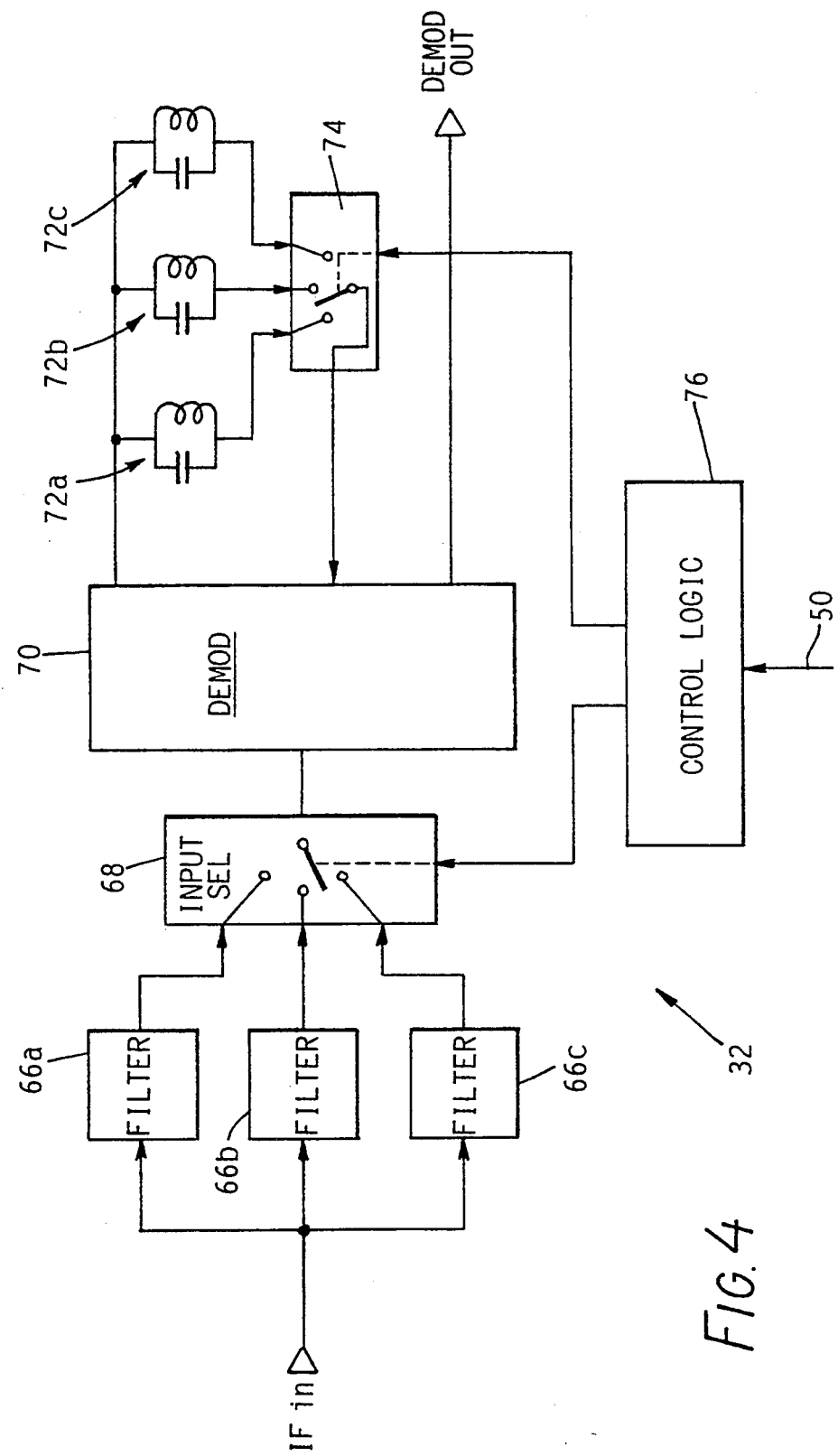
FIG. 4 is a block diagram of the A.M. demodulator included in FIG. 3.

FIG. 4 shows the demodulator 32 in more detail. The input to the demodulator is fed through three bandpass filters 66a, 66b and 66c connected in parallel. These filters are selected to suit the frequency bandwidth characteristics of the UK, European and US broadcasting standards described hereinbefore. The first filter 66a has a bandwidth of around 8 MHz for UK standard signals. The second filter 66b has a bandwidth of around 7.5 MHz for European standard signals. The third filter 66c has a bandwidth of around 6 MHz for U.S. NTSC signals. An electronically controlled input selector 68 selects which filtered signal is fed to the FM demodulator shown schematically as the box 70. A suitable demodulator circuit 70 can be built around a standard FM demodulator integrated circuit, such as the LA7530 for Mitsubishi. The M demodulator 70 is also coupled to three tuned circuits 72a, 72b and 72c for selecting on which intercarrier frequency the sound is to be demodulated. The circuits 72a, 72b and 72c correspond respectively to the intercarrier frequencies of 6, 5.5 and 4.5 MHz for UK, European and US broadcasting standards, respectively. An electronically controlled frequency selector 74 selects which of the tuned circuits 72a, 72b, 72c is coupled to the AM demodulator 70. Although the tuned circuits are shown schematically as LC parallel circuits, ceramic filters could be used instead.

The input selector 68 and the intercarrier frequency selector 74 are each controlled by control logic 76 which is coupled to the control bus 50 from the demodulator controller (44 in FIG. 3). For UK broadcasts, the input selector 68 is controlled to select the first filter 66a and the frequency selector 74 is controlled to select the first tuned circuit 72a. Similarly, for European broadcasts, the input selector is set to the second filter 66b, and the frequency selector is set to the second tuned circuit 72b. For US broadcasts, the input selector is set to select the third filter 66c, and the frequency selector 74 is set to select the third tuned circuit 72c.

The embodiment described above uses a domestic television type receiver, however, other types of receiver can also be used to receive other broadcast signals.

For satellite broadcasts, the antenna 24 is replaced by a satellite dish. The tuner module can be built around a standard satellite signal RF tuner module. A suitable module is the CB112 from Mullard. For satellite broadcast signals, the sound is commonly FM modulated, therefore an FM demodulator is required. The demodulator can be built around a standard integrated circuit demodulator. A suitable circuit is the SL1451 from Plessey. Teletext broadcasts from satellites are commonly transmitted continuously in sub-carriers of the main television signal, and the demodulation parameters of the demodulator 32 and the extraction parameters of the data extractor 36 are controlled to decode the teletext signals appropriately.

The tuner can also be a broadband tuner capable of receiving both satellite and domestic television signals, and the demodulator a multi-function AM/FM demodulator. With such a tuner/demodulator arrangement, the tuning frequency and the demodulation type and parameters are controlled by the system processor coupled through the interface control bus.

The broadcast signals can also be in the form of cable television signals, and to receive these, the antenna 24 is replaced by a cable connector. The tuner 30 can be built around a standard cable television hyperband tuner module. A suitable module is the UV635 from Mullard.

The broadcast signals can also be in the form of optically encoded signals, and to receive these, the antenna 24 is replaced by an optical input connector, for example, an optical fibre connector. The tuner 30 and the demodulator 32 comprise the equivalent optical decoder circuitry, and will depend on the type of optical broadcast signal.

FIG. 5 shows a modified embodiment of the invention in the form of a multi-tuner receiver 80. The receiver is capable of receiving and decoding data on several broadcast channels simultaneously, under the control of the system processor. Three individual tuners 82a, 82b, 82c and associated demodulators 84a, 84b, 84c, respectively, are provided in the receiver. Each tuner has a respective input 86 connectable to a broadcast signal input, for example to the antenna 24.

The tuners 82 can be of any of the types described above. For example, the first tuner 82a could be a domestic television tuner, the second tuner 82b a satellite television tuner, and the third tuner 82c a broadband tuner capable of receiving a domestic or satellite television signal.

The output from each tuner and demodulator is coupled to a respective data extractor 88. Together the associated tuners, demodulators and data extractors form three sub-receivers 90a, 90b, 90c, respectively, each of which is controllable by the system processor 12 through the bus interface control circuit 40, in a similar manner to the single channel receiver 22 described above. The tuner 82a, the demodulator 84a and the data extractor 88a of the first sub-receiver 90a are each coupled through a first control bus 92a to a first tuner controller 94a, a first demodulator controller 96a and a first data extractor controller 98a, respectively. These controllers are similar to the tuner controller 42, the demodulator controller 44 and the data extractor controller 46 described hereinbefore.

The second sub-receiver 90b is similarly connected through a second control bus 92b to a second tuner controller 94b, a second demodulator controller 96b, and a second data extractor 98b in the bus interface controller 40. The third sub-receiver 90c is connected through a third control bus 92c to a third tuner controller 94c, a third demodulator controller 96c and a third data extractor controller 98c.

The outputs from the first, second and third data extractors, 88a, 88b, 88c, respectively, are coupled to a data selector 100. The data selector is coupled to a data selector controller 102 in the bus interface control circuit 40, which controls the data selector 100 in response to instructions from the system processor 12 to select one of the data outputs from the extractors 88. The output from the data selector 100 is fed to the data input of the local processor 54.

The demodulated signal outputs from the first, second and third demodulators 84a, 84b, 84c, respectively, are coupled to a video selector 104. The video selector is coupled to a video selector controller 106 in the bus interface control circuit 40, which controls the video selector in response to instructions from the system processor 12 to select one of the demodulated outputs. The output from the video selector 104 is fed to the video bus 26.

The local processor 54 can also control the first, second and third, tuner controllers 94, demodulator controllers 96 and data extractor controllers 98.

Under the control of the software codes stored in the memory 18 of the computer system 10, the system processor 12 controls the tuning of the receiver 22 or 80 to receive broadcast signals on one or more channels. When using the multi-tuner receiver 80, the signals may be received on several channels simultaneously. The extracted data can be processed by the local processor, and then communicated to the system processor 12, where it can be further processed, stored, displayed, or used for making logical decisions. Demodulated and decoded video signals can be communicated between any of the receiver, the system processor 12, the video processor 25 and the video tape recorder 28 by means of the video bus 26, under control of the system processor 12.

One possible application of the invention is to monitor teletext information channels for desired data. Teletext information is repeated, or updated, periodically. The period depends on how many teletext pages are available, and may typically be around 30 seconds. Thus scanning or monitoring of several teletext channels my be effected sequentially by tuning into each channel for a predetermined interval of time, or it may be done simultaneously with a multi-tuner receiver by tuning each sub-receiver to one of the channels, or by a combination of these methods.

As an example of a first possible application for the invention, say that a user wished to record a television programme having a certain name. By suitable programming, the system processor 12 operating together with the local processor 54 control the receiver 22 or 80 to monitor the television programme schedule pages of the available teletext channels. The local processor 54 monitors the extracted teletext data, and searches for the name of the programme. Once this has been found, the local processor 54 ascertains the relevant television channel and start time of the programme. The processor can also ascertain the time when the programme is due to finish by referring to the start time of the following programme. The information is sent to the system processor 12 which then controls the video tape recorder to record the programme from the appropriate television channel at the appropriate time. The system processor can either do this by programming the timer of the video recorder 28 to automatically record the correct programme, or the system processor can control the video recorder 28 in real time to begin and finish recording at the appropriate times.

In a further possible application, the computer operator may be interested in any travel information available on teletext. The operator instructs the computer 10 that he wishes any information regarding travel to be saved for his later retrieval. He further tells the computer that the most likely sources of information are the teletext services provided on the domestic UK television channels of BBC1, BBC2, ITV and Channel 4. The computer now starts to monitor the relevant television channels searching for the teletext key word "travel". On encountering the key word in any of the monitored data streams, i.e. the four television channels, the relevant data frame or packet is saved to the magnetic disk 20 for later retrieval, and the system then continues to search for further information. If the key word is found in a news-flash page then the system can search the programme schedule pages as described above, to ascertain the time and channel on which the next news programme will be broadcast. At the appropriate time, the video recorder is controlled to record the news programme. If the key word is found in the television programme schedule pages themselves, then in a similar manner, the system processor 12 can instruct the video tape recorder to record the corresponding programme at the appropriate time from the relevant television channel. The computer 10 can maintain an index on its disk 20 of the video recorded by the video recorder 28. This allows the operator to retrieve the teletext stored on the disk 20 and, by using the index, to quickly find and view the associated video recorded by the video recorder 28.

The system processor 12 can also be programmed to scan for all available channels when searching for the keywords.

The bus interface control circuit 40, the data selector, and the video selector may conveniently be incorporated into an ASIC integrated circuit.

Although in the modified embodiment described above, three sub-receivers are provided, in other embodiments, any number of independently controllable sub-receivers may be provided. The sub-receivers may be universal broadband receivers, or dedicated receivers, or a combination of both.

Although in the examples described above, the broadcast signals have for the most part been television signals, it will be appreciated that the signals may be received from cable or optical fibre networks, or from satellite dishes.

I claim:

1. A personal computer provided with a broadcast receiver, said personal computer comprising:
   a main housing;
   a microprocessor and a main memory in said housing;
   a plurality of expansion slots in said housing, each said expansion slot having a first connector therein for receiving a mating connector on an expansion card;
   an interface bus connecting said first connectors of said expansion slots and coupled to said microprocessor;
   a visual display unit coupled to said housing;
   a keyboard coupled to said housing; and
   a broadcast receiver expansion card in a selected one of said expansion slots, said broadcast receiver expansion card comprising:
   a tuner for receiving broadcast signals;
   a data extraction circuit for extracting data from signals received by said tuner;
   a second connector engaged with said first connector of said selected expansion slot;
   an external signal receiving connection coupled to an input of said tuner; and
   a control interface connected to said second connector and including control means connected to said tuner for controlling said tuner and connected to said data extraction circuit for controlling said data extraction circuit, such that said control means are directly controlled by said microprocessor of said personal computer.

2. A personal computer according to claim 1, further comprising a video processing expansion card in another of said expansion slots.

3. A personal computer according to claim 2, further comprising an analogue video bus coupling said broadcast receiver expansion card and said video processing expansion card.

4. A personal computer according to claim 1, further comprising a demodulator coupled between said tuner and said data extraction circuit for demodulating signals received by said tuner and having controllable demodulation parameters, said control means being connected to said demodulator to control said demodulator such that said control means controls said demodulator directly under the control of said microprocessor of said personal computer.

5. A personal computer according to claim 1, further provided with video signal storage means and including an analogue video bus coupling said broadcast receiver expansion card and said video signal storage means.

6. A personal computer according to claim 5, further comprising video control means for controlling said video storage means to store or playback received video signals, and programmable means for processing extracted data from said data extraction circuit and for sending control signals to said microprocessor and to said video control means in response to the results of the processed data.

7. A personal computer provided with a broadcast receiver, said personal computer comprising:
   a microprocessor; and
   connector means coupled to said microprocessor;
   wherein said broadcast receiver is a unit removably installed in said personal computer and releasably coupled by said connector means to said microprocessor, said broadcast receiver including:
   a tuner for receiving broadcast signals;
   a demodulator coupled to said tuner for demodulating signals received by said tuner, said demodulator having controllable demodulation parameters;
   a data extraction circuit coupled to said demodulator for extracting data from signals received by said tuner; and
   a control interface releasably coupled by said connector means to said microprocessor and including control means, said control means being connected to said tuner, to said demodulator, and to said data extraction circuit for control thereof under the control of said microprocessor of said personal computer, including control of said demodulation parameters for said demodulator.

8. A personal computer according to claim 7, including a main housing having therein said microprocessor, a main memory which is coupled to said microprocessor, and said broadcast receiver; a visual display unit coupled to said housing; a keyboard coupled to said housing; and an external signal receiving connection coupled to an input of said tuner.

9. A personal computer provided with a broadcast receiver, said personal computer comprising:
   a main housing;
   a microprocessor and a main memory in said housing, said main memory being coupled to said microprocessor;
   a plurality of expansion slots in said housing, each said expansion slot having a first connector therein for receiving a mating connector on an expansion card;
   an interface bus connecting said connectors of said expansion slots and coupled to said microprocessor;

a visual display unit coupled to said housing and said microprocessor therein;

a keyboard coupled to said housing and said microprocessor therein; and a broadcast receiver expansion card in a selected one of said expansion slots, said broadcast receiver expansion card comprising:

a tuner for receiving broadcast signals;

a second connector matingly engaging said first connector of said selected expansion slot;

an external signal receiving connection coupled to an input of said tuner; and a control interface connected to said second connector and including control means connected to said tuner for controlling said tuner, said control means being directly controlled by said microprocessor of said personal computer.

10. A personal computer provided with a broadcast receiver, said personal computer comprising:

a main housing;

a microprocessor and a main memory in said housing, said main memory being coupled to said microprocessor;

an interface bus coupled to said microprocessor;

a visual display unit coupled to said housing;

a keyboard coupled to said housing; and a broadcast receiver in said housing, said broadcast receiver comprising:

a tuner for receiving broadcast signals;

a data extraction circuit for extracting data from signals received by said tuner;

an external signal receiving connection coupled to an input of said tuner; and a control interface connected to said interface bus and including control means connected to said tuner for controlling said tuner and to said data extraction circuit for controlling said data extraction circuit, said control means being directly controlled by said microprocessor of said personal computer.

11. A personal computer according to claim 10, including a demodulator coupled to said tuner for demodulating signals received by said tuner, said demodulator having controllable demodulation parameters; and wherein said control means is connected to said demodulator for control thereof under the control of said microprocessor of said personal computer.

12. A personal computer according to claim 10, including means for processing the extracted data in said computer to obtain the time that a television program will be broadcast, for controlling said receiver to receive the program when it is broadcast, and for storing the received program on a video signal storage means.

13. A personal computer according to claim 12, wherein said means for processing the extracted data includes means for searching the extracted data for a predetermined keyword.

14. A personal computer according to claim 13, wherein said control means controls said receiver to scan several signal channels, and said means for processing effects processing of the data extracted for each of said signal channels.

15. A personal computer according to claim 10, including:

a further tuner for receiving broadcast signals; and a further data extraction circuit for extracting data from the signals received by the further tuner;

wherein said control means is connected to said further tuner for controlling said further tuner and to said further data extraction circuit for controlling said further data extraction circuit.

16. A personal computer according to claim 15, including two demodulators each having controllable demodulation parameters and each coupled between a respective said tuner and a respective said data extraction circuit, wherein said control means is connected to each of said demodulators for controlling said demodulation parameters thereof.

17. An expansion board adapted for removable insertion into an expansion slot of a personal computer, said expansion board comprising:

a tuner for receiving broadcast signals;

a connector;

an external signal receiving connection coupled to an input of said tuner; and a control interface connected to said connector and including control means connected to said tuner for controlling said tuner, said control means being controlled by signals received through said connector.

18. An expansion board according to claim 17, including: a data extraction circuit for extracting data from signals received by said tuner; and wherein said control means is connected to said data extraction circuit for controlling said data extraction circuit.

19. An expansion board according to claim 18, including: a demodulator coupled between said tuner and said data extraction circuit and having controllable demodulation parameters, wherein said control means is connected to said demodulator for controlling said demodulation parameters thereof.

20. An expansion board according to claim 19, wherein said demodulator includes a plurality of filters each having an input coupled to the output of said tuner; an input selector having a plurality of inputs each coupled to the output of a respective said filter and having an output, said selector selectively coupling one of said inputs thereof to said output thereof; an FM demodulator having an input coupled to an output of said input selector, having an output which is coupled to said data extraction circuit, and having three tuned circuits and a further selector which selects a respective one of said tuned circuits; wherein said input selector and said further selector are controlled by said control means to effect said control of said demodulation parameters.

21. An expansion board according to claim 19, including: a local processor coupled to an output of said data extraction circuit, and wherein said control means is connected to said local processor for controlling said local processor, said local processor having an output coupled to said control interface.

22. An expansion board according to claim 17, including a further tuner for receiving broadcast signals, said control means being connected to said further tuner for controlling said further tuner.

23. An expansion board according to claim 22, including two data extraction circuits each coupled to an output of a respective said tuner for extracting data from signals received by the tuners, a data selector having two inputs each coupled to an output of a respective said data extraction circuit and having an output, said control means being connected to each of said data extraction circuits for effecting control thereof and being connected to said data selector for causing said data selector to couple a selected one of said inputs thereof to said output thereof.

24. An expansion board according to claim 22, including two demodulators each having controllable demodulation parameters and each having an input coupled to an output of a respective said tuner, and including a video selector having two inputs each coupled to an output of a respective said demodulator and having an output, said control means being connected to each of said demodulators for controlling said demodulation parameters thereof, and being connected to said video selector for causing said video selector to couple a selected one of said inputs thereof to said output thereof.

* * * * *